Patented Nov. 18, 1930

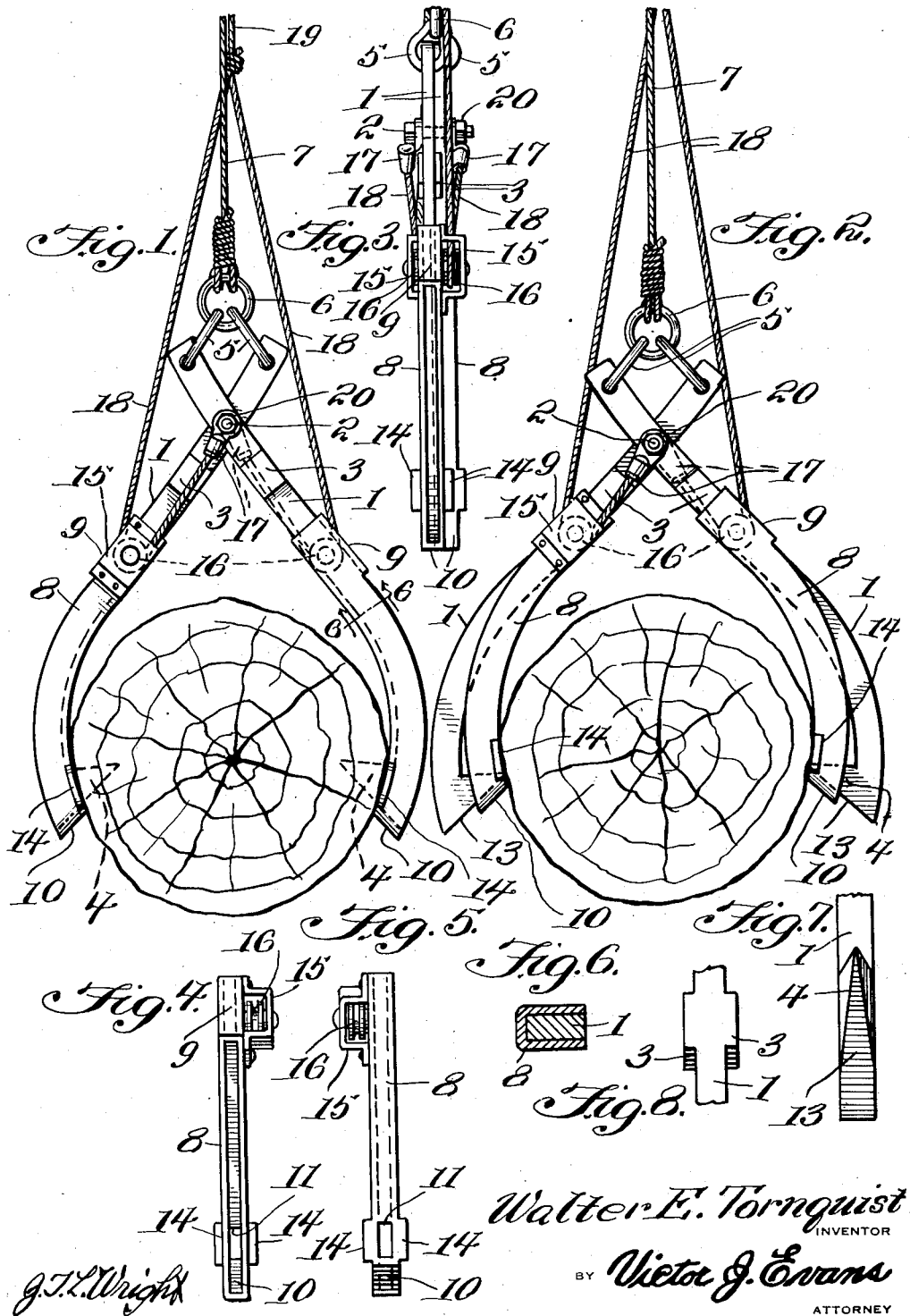

1,782,326

UNITED STATES PATENT OFFICE

WALTER E. TORNQUIST, OF HOQUIAM, WASHINGTON

HOISTING TONGS

Application filed March 13, 1930. Serial No. 435,568.

My present invention has reference to a hoisting tongs, and is particularly directed to tongs for handling logs, but obviously the same may be employed for other purposes and the primary object of the invention is the provision of tongs with means for spreading the pointed or prong end of the tongs away from each other to bring the same out of impinging engagement with the object engaged thereby, and thereby release such object from such engagement.

A still further object is the provision of means in connection with hoisting tongs which are operable to cause the tongs to move therethrough to bring the points or prongs of the tongs out of the objects engaged thereby and wherein such means will, when the tongs are thus released, grippingly engage with the object to permit of the gentle lowering thereof, the said means being also operable to be brought quickly out of its engagement with the object to permit of the object abruptly falling therefrom.

For a full and comprehensive understanding of the improvement, reference is to be had to the accompanying drawings which form part of the application, and to be read in connection with the following description and appended claims.

In the drawings:

Figure 1 is a side elevation of the improvement in operative position.

Figure 2 is a similar view but illustrating the arrangement of parts when the points or prongs of the tongs are brought out of impinging engagement with a log or like object.

Figure 3 is an edge view of the improvement.

Figure 4 is an edge view of one of the tongs releasing members looking toward the outer face thereof.

Figure 5 is a similar view but looking toward the inner face of the tongs releasing member.

Figure 6 is a detail sectional view approximately on the line 6—6 of Figure 1.

Figure 7 is a detail edge view of one of the arms of the tongs to illustrate the stop shoulders thereon.

Figure 8 is a detail view looking toward the point or prong end of one of the tongs members.

The tongs comprise a pair of arms 1 which are crossed and which are pivotally connected, as at 2. The arms 1, at a suitable point below the pivot 2, have their sides thickened to form stop elements 3. The arms of the tongs have their outer portions arched inwardly and the ends thereof are formed with impinging points or prongs 4, which, of course, are directed toward each other. The lower edge of each of the prongs is cut angularly to the pointed ends thereof. The second or upper ends of the prongs have passed through openings therein ring members 5 through which is passed another ring 6 and this ring 6 has secured thereon a pull line 7.

The tongs releasing members are each of a similar construction and, therefore, each indicated by the numeral 8. Each of these members has an upper comparatively straight portion and a lower arched portion. Each of the members from its outer edge is for the major portion of its length bifurcated so that the members are really in the nature of channeled elements. The sides of the members, on the straight ends thereof are connected by an integral plate 9. The plate, together with the channeled body of the members provide the same with what may be termed a yoke. The lower ends of the bifurcated or channeled members 8 are closed and arranged at an angle, as indicated by the numerals 10. The inner edge or wall of the members have each an opening 11 through which the prongs 4 of the tongs are designed to pass and the angle ends 13 of the said prongs are guided along the angle lower walls 10 of the said members 8. The members 8, to the opposite sides of the openings 11 therein are formed with flat lateral extensions 14. The straight portions of the arms of the tongs are guided through what I will term the yoke ends of the members 8 and as inferred the arched portions and prong ends of the tongs are received in the said channeled members. The members 8, opposite the yoke ends thereof, have their respective opposite sides provided with substantially U-shaped housings 15 for the grooved or sheave wheels 16, the shafts for the said wheels being, of course, journaled in the housings and in the outer faces of the tongs releasing members 8. The pivot 2 for the tongs has mounted on its opposite ends the eyes of socket members 17 to which are connected the ends of lines 18 which are trained around the respective sheave wheels 16. The top of the housings 15 are notched or slotted for the passage of the ends of the lines 18 which are connected to the sockets 17. The lines 18 are brought together and are knotted and continued or connected to a single line 19. The pivot 2 has secured on its ends bolts or analogous elements 20 which hold the eyes of the sockets on said pivot and likewise prevent the longitudinal movement of the pivot.

In operation the line 7 is drawn taut which, of course, will swing the prong or pointed ends of the tongs toward each other so that the same will enter the sides of a log or like object. The log is elevated or swung to a proper position at the place or object at which the log is received. When the log is thus arranged in receiving position the line 7 is permitted to slack and the line 19 is drawn taut. This will cause the strands or lines 18 to first swing the outer ends of the members 8 against the object engaged by the prongs of the tongs and thereafter will cause the tongs to move downwardly and outwardly through the channeled tongs releasing members 8, bringing the prongs 4 and tongs out of impinging engagement with the object. The pressure of the tongs releasing members against the sides of the object will hold the same so that the object can be lowered or slowly delivered to its receiving place or object and by slacking the line 19 the object may be caused to abruptly fall between the tongs releasing members 8 as will, it is thought, be apparent. The elements 14 widen the gripping end of the members 8 so that the same will not enter the sides of the object engaged thereby.

It is believed the construction and advantages of the improvement will be understood and appreciated by those skilled in the art to which such invention relates so that further detailed description will not be required.

Having described the invention, I claim:

1. A hoisting tongs comprising a pair of crossed arms which are pivotally connected and which have their outer ends arched inwardly and formed at their ends with inwardly projecting prongs, a pull line connected to the upper ends of the arms for swinging the prongs toward each other, a channeled member in which the arched and pointed ends of the prongs are received, each of said members having an opening in the inner face thereof for the passage of the prongs therethrough, each of said members having its opposite end closed, lines connected to the pivot for the arms of the prongs, sheave wheels on the sides of the closed ends of the members to which the lines are trained and a cable connected to the lines.

2. A hoisting tongs comprising a pair of flat arms, which are crossed and which are pivoted together, said arms having their outer portions arched inwardly and their ends formed with inwardly directed prongs, the lower ends of the prongs being arranged at an angle, channeled members having their lower portions arched, and their outer ends arranged at an angle and closed, and their inner closed edges provided with openings for the passage of the prongs therethrough and having yokes at their inner ends for retaining the arms of the tongs therein, laterally extending stop shoulders on the arms of the tongs, rings connected to the straight ends of the prongs, a pull line connected to the rings, a housing on the opposite sides of the yoke end of the channeled members, a sheave wheel having a shaft journaled in each housing, lines trained under the sheave wheels, eye carrying sockets in the ends of the lines connected to the pivot for the tongs and a cable to which the lines are connected.

3. A pair of hoisting tongs which are pivotally connected and which have their outer ends formed with inwardly directed impinging arms, a pull line for swinging the arms of the tongs to bring the tongs toward each other, a member slidable on the arm of each tongs, and through each arm of the prongs and receiving the prongs and the tongs therethrough, and through which member the arms of the tongs are outwardly swingable and means for moving the members toward each other to cause the arms of the prongs to slide through such members and to be moved outwardly therefrom to bring the prongs of the tongs through said members.

4. A pair of tongs having inwardly directed prongs to penetrate an object engaged thereby and bifurcated members on each of the arms of the tongue receiving the prongs therethrough and arranged for both slidable and swinging movement on said arms, and means for imparting such movement to said members to cause the said members to move toward each other to slide the arms of the tongs outwardly thereof to cause such members to engage with the object that was previously engaged by the prongs of the tongs, and said members having laterally extending object engaging elements thereon.

In testimony whereof I affix my signature.

WALTER E. TORNQUIST.